United States Patent [19]
Miyahara

[11] Patent Number: 5,878,197
[45] Date of Patent: Mar. 2, 1999

[54] IMAGE FORMING APPARATUS CAPABLE OF PROCESSING DATA AT HIGH SPEED IN ACCORDANCE WITH A HIGH SPEED DATA TRANSMISSION INTERFACE

[75] Inventor: Tadayoshi Miyahara, Kawasaki, Japan

[73] Assignee: Ricoh Company, Ltd., Tokyo, Japan

[21] Appl. No.: 762,956

[22] Filed: Dec. 10, 1996

[30] Foreign Application Priority Data

Dec. 11, 1995 [JP] Japan ................................. 7-346497
Sep. 27, 1996 [JP] Japan ................................. 8-277572

[51] Int. Cl.$^6$ ................................................. G06F 13/00
[52] U.S. Cl. ............................................ 395/115; 395/114
[58] Field of Search .................................. 395/113, 114, 395/115, 101, 800.01, 800.25, 800.29, 800.38, 800.43, 842, 843, 868

[56] References Cited

U.S. PATENT DOCUMENTS

| | | | |
|---|---|---|---|
| 4,847,752 | 7/1989 | Akashi ................................. | 364/200 |
| 4,953,103 | 8/1990 | Suzuki ................................. | 364/519 |
| 5,355,441 | 10/1994 | Kawai et al. ......................... | 395/115 |
| 5,425,135 | 6/1995 | Motoyama et al. .................. | 395/114 |
| 5,455,895 | 10/1995 | Hattori ................................. | 395/112 |
| 5,461,701 | 10/1995 | Voth ..................................... | 395/101 |

*Primary Examiner*—Edward L. Coles
*Assistant Examiner*—Joseph R. Pokrzywa
*Attorney, Agent, or Firm*—Oblon, Spivak, McClelland, Maier & Neustadt, P.C.

[57] ABSTRACT

An image forming apparatus capable of processing data at a relatively high speed in accordance with a data transmission speed from a host system. The image forming apparatus includes a central processing unit, a memory, and a host system interface. When data inclusive of print data and control data is transmitted from the host system to the image forming apparatus, the host system interface starts a direct memory access (DMA) with the memory to store the print data at a relatively high speed in accordance with the data transmission speed from the host system. The host system interface includes a data receiver to be connected to the host system, a data determiner, a control data checker, a print data register, a control data register, a DMA address register, and an address counter. The data determiner determines whether received data is print data or control data by comparing control data stored in the control data checker, executes DMA operation when the received data is print data, while terminating DMA when the received data is control data.

19 Claims, 4 Drawing Sheets

IMAGE FORMING APPARATUS CAPABLE OF PROCESSING DATA AT HIGH SPEED IN ACCORDANCE WITH A HIGH SPEED DATA TRANSMISSION INTERFACE

BACKGROUND OF THE INVENTION

1. Field of the Invention

This invention relates to an image forming apparatus such as a laser beam printer, and more particularly to an image forming apparatus such as a laser beam printer which is capable of processing data at a relatively high speed in accordance with a data transmission speed provided from a host system to the laser beam printer through an interface operative in a high speed data transmission mode such as ECP (extended capabilities port) defined by IEEE (Institute of Electrical and Electronics Engineers).

2. Discussion of the Background

A new parallel port interface operative for data transmission between a host system and an image forming apparatus such as a laser beam printer has recently been standardized by IEEE (Institute of Electrical and Electronics Engineers). This interface is called IEEE-1284 and includes a new bidirectional communication mode generally referred to as ECP (extended capabilities port). A maximum of 2 Mbytes per second is a data transmission speed featured by ECP, which is faster than a popular interface known as Centronics connecting an image forming apparatus such as a laser beam printer to a personal computer and transmitting data at 100 to 150 Kbytes per second as a maximum speed. ECP, in addition, features a bidirectional communication capability although it has a relatively simple specification similar to that of the background Centronics, a uni-directional interface, and is thus called bi-directional Centronics to differentiate from the background uni-directional Centronics.

Data transmitted from a host system to an image forming apparatus generally includes two types of data. One type of data is defined as print data which includes image data, image form related data such as a carriage return code, and the like. These print data are needed to be processed together in an originally received sequence. The other type of data is defined as control data for requesting various actions, such as, a cancel data command for canceling designated data, a status request command for requesting printer status information, and so forth. These control data can also be classified by levels of urgency requesting immediate actions. As an example, the above-mentioned cancel data command may be classified as a highly urgent command because if the action of the image forming apparatus in response to this command is delayed, then the canceled data may possibly be printed and the command consequently fails. A paper tray selection, as another example for the command classification, may be classified because the paper tray selection is needed only when the image forming apparatus starts printing after completing data processing. When such data including print data and control data is transmitted from a host system to a background image forming apparatus through ECP mentioned above, the background image forming apparatus receives the data and then transmits the received data into a RAM (random access memory) thereof. For the data transmission to the RAM, the background image forming apparatus generally adopts DMA (direct memory access) since DMA is a high speed data transmission and host independent operation. Because of this host-independent operation, the load of the CPU of the background image forming apparatus is not increased by DMA.

In the event of the data transmission, if data storage in the RAM is made without distinguishing commands from print data, the background image forming apparatus can not transmit the print data from the RAM to a print unit before separating the print data and control data. The background image forming apparatus thus causes problems in executing DMA and actions requested by control data.

There has been proposed a solution to obviate the above-mentioned problems. An image forming apparatus having this solution can determine whether received data from a host system represents print data or control data by arranging a CPU thereof to check a so-called Host Ack signal transmitted together with the data from a host system for indicating whether the data under transmission is print data or control data. On the other hand, when utilizing this solution the CPU increases its load with increasing data transmission speed through a high speed data transmission interface such as ECP.

Furthermore, since the load to the CPU of the background image forming apparatus is variant, the CPU does not always have enough power for processing immediate actions requested by the control data. In such a situation, an event may subsequently be caused in which the CPU only processes the control data in a temporary manner and leaves a remaining part of the actions requested by the control data to be processed later. A resultant delay in processing the control data may pose a serious problem, particularly in a case that immediate actions are requested by the control data.

Because of these problems in processing data, a great delay has resulted in the development of an image forming apparatus such as a laser beam printer including a data transmission interface compatible to the new high speed data transmission interface such as ECP of IEEE-1284 defined by IEEE. Subsequently, an image forming apparatus that obviates the above-mentioned problems, or that is capable of processing data including print data and control data at a relatively high speed in accordance with a data transmission speed from a host system using ECP has not yet been developed.

SUMMARY OF THE INVENTION

Accordingly, an object of the present invention is to provide a novel image forming apparatus which obviates the above-mentioned problems.

Another object of the present invention is to provide a novel image forming apparatus which is capable of processing data at a relatively high speed in accordance with a data transmission speed provided from a host system to the image forming apparatus through an interface operative in a high speed data transmission mode such as ECP defined by IEEE.

To achieve the above-mentioned objects, according to the present invention an image forming apparatus includes a memory for storing print data. A central processing unit controls entire operations of the image forming apparatus and a data receiver receives data including print data and control data sent from a host system under a first data transmission mode. A first register stores the print data sent from the data receiver and outputs the print data to the memory under a second data transmission mode and a second register stores the control data sent from the data receiver.

The image forming apparatus further includes a third register for storing a value for designating an address in the memory into which the print data stored in the first register is transferred under the second data transmission mode and a counter for reading the address stored in the third register, for outputting the address to an address bus line under the second data transmission mode, and for incrementing the address by one.

The image forming apparatus further includes a fourth register for storing a predetermined number of control data which can be processed after data transmission and a print unit for printing the print data stored in the memory.

The image forming apparatus further includes a data determiner which includes functions for sending an interrupt signal to the central processing unit to notify a start of the second data transmission mode and to request transferring the address in the memory at which print data is stored to the third register upon detecting the data sent from the data receiver. The data determiner includes a further function for comparing the data sent from the data receiver and control data stored in the fourth register, for accordingly determining whether the data sent from the host system is either one of print data or control data. The data determiner includes a further function for activating input and output gates of the first register, the third register, and the counter to store the print data to the first register and to set the second data transmission mode and for invalidating input and output gates of the second register when the data determiner determines that the data is print data. The data determiner includes further functions for invalidating input and output gates of the first register, the third register, and the counter to terminate the second data transmission mode, for activating input and output gates of the second register to store the control data sent from the data receiver and for instructing the counter to transfer the present storing value which is a last address of the second data transmission mode to the third register when the data determiner determines that the data is control data.

Further, to achieve the above-mentioned objects, the image forming apparatus includes the data receiver which may be in conformance to a data transmission mode referred to as ECP defined by IEEE.

Further, to achieve the above-mentioned objects, the image forming apparatus includes the second register which may be capable of storing a predetermined number of control data, and a data determiner sends an interrupt signal to the central processing unit to request immediate processing of control data stored in the second register upon detecting that the second register is filled with the predetermined number of control data.

Further, to achieve the above-mentioned objects, the image forming apparatus may include a fifth register for storing a predetermined number of control data which are needed to be immediately processed by the central processing unit, and the data determiner sends an interrupt signal to the central processing unit upon detecting such control data needed to be immediately processed, so as to request immediate processing of such control data.

Further, to achieve the above-mentioned objects, the image forming apparatus may operate the second data transmission mode as a direct memory access mode referred to as DMA.

With the host system interface thus configured, an image forming apparatus becomes capable of processing data at a relatively high speed in accordance with a data transmission speed provided from a host system to the image forming apparatus through an interface operative in a high speed data transmission mode such as ECP (extended capabilities port) defined by IEEE (Institute of Electrical and Electronics Engineers).

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 1:
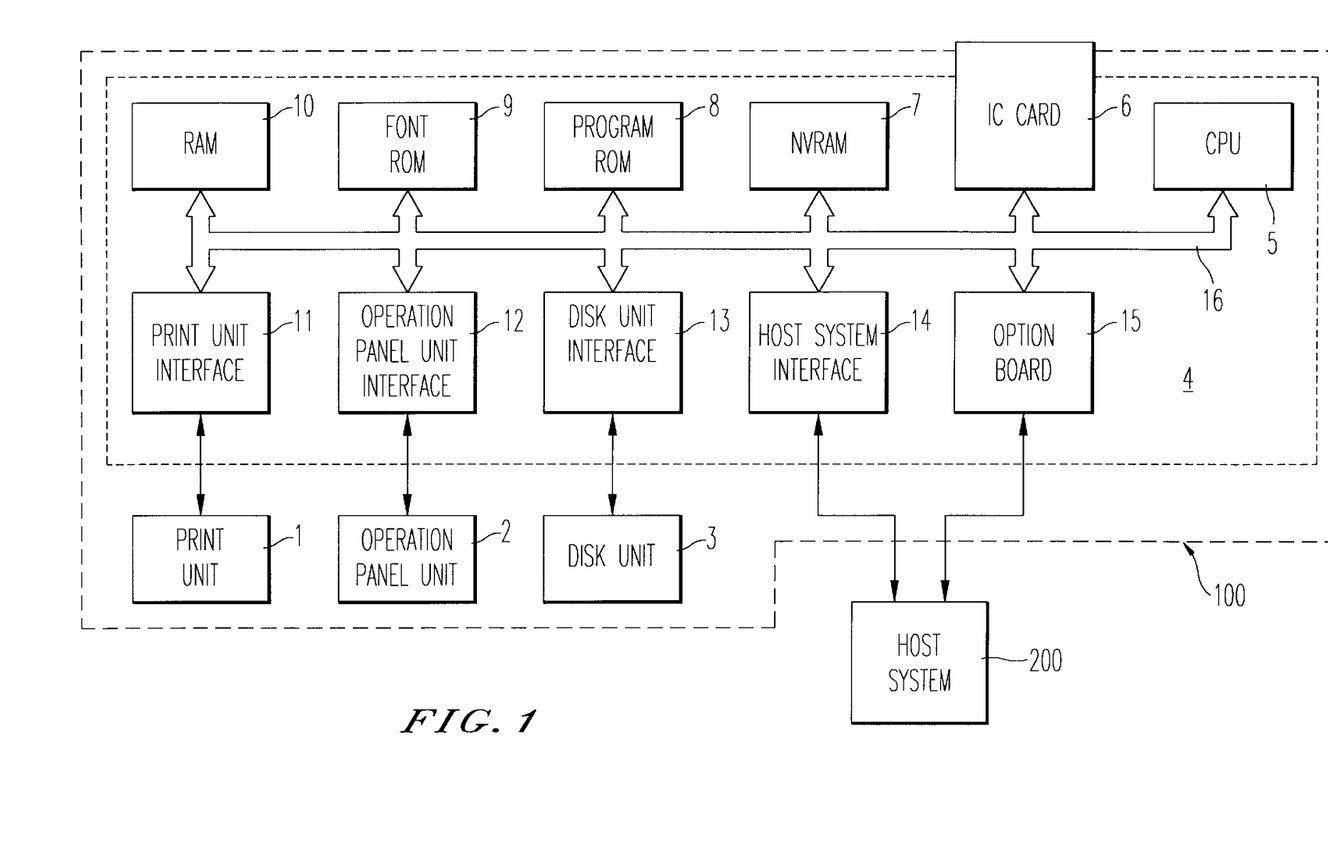
FIG. 1 is a block diagram of an image forming apparatus as an exemplary embodiment according to the present invention.

Referring now to the drawings, wherein like reference numerals designate identical or corresponding parts throughout the several views, and more particularly to FIG. 1 thereof, a block diagram for explaining mainly a controller portion of a configuration of a laser printer 100 as an exemplary embodiment of an image forming apparatus according to the present invention is shown. The laser printer 100 shown in FIG. 1 includes a print unit 1 for forming an image, an operation panel unit 2 for receiving, for example, mode instructions input by an operator and for indicating, for example, a status of the printer, a mode in operation, and so forth, a disk unit 3 for storing various kinds of data, such as, for example, font data, a program, data to be printed, and so on, and a control unit 4. A host system 200 is connected to the control unit 4 of the printer 1.

In the control unit 4 shown in FIG. 1, reference numeral 5 denotes a CPU for controlling an entire operation of the control unit 100 in accordance with commands received from the host system 200, reference numeral 6 denotes an IC (integrated circuit) card for containing extra data of optional resources, such as, print fonts, optional programs, and so forth. Further, reference numeral 7 denotes a nonvolatile random access memory (NVRAM) for storing, for example, contents of instructions for the currently selected mode, and so forth. Further, reference numeral 8 denotes a program ROM for storing a control program of the control unit 4, reference numeral 9 denotes a font ROM for storing pattern data and so forth for print fonts, and reference numeral 10 denotes a RAM for serving as a working memory of the CPU 5, an input buffer for storing input data, a page buffer for storing print data, a font storage for storing downloaded fonts, and so forth. Further, reference numeral 11 denotes a print unit interface for interfacing with the print unit 1 through transmitting various data, such as, commands, status, print data, and so forth. Further, reference numeral 12 denotes an operation panel unit interface for interfacing with the operation panel unit 2 through transmitting various data, such as, commands, status, and so forth. Further, reference numeral 13 denotes a disk unit interface for interfacing with the disk unit 3. The disk unit 3 can be implemented as a floppy disk unit, a hard disk unit, and the like.

Further in FIG. 1, reference numeral 14 denotes a host system interface, including a data receiving portion compatible to bi-directional Centronics, for communicating with the host system 200. In the embodiment of the present invention, the host system interface 14 is configured of an application specific integrated circuit (ASIC). In addition to a function for controlling bi-directional data transmission, the host system interface 14 includes another function for generating an interrupt signal (INT) for notifying the CPU 5, for example, of an event that the laser beam printer 100 is in a data receiving mode upon detecting data transmission from the host system 200.

Still further in FIG. 1, reference numeral 15 denotes an option board including several communication interfaces, such as, background uni-directional Centronics, RS232C, Apple Talk, Ethernet, and so forth, to receive data from various host systems in conformance to these interfaces. This option board 15 is not an essential element to the present invention but broadens communication capability.

These functional elements denoted by reference numerals 5–15 in FIG. 1 are connected to each other by system bus line 16 which includes a data bus line and an address bus line.

Next, a sequential operation from data receiving to image forming of the laser beam printer 100 is explained with respect to FIG. 1. When the host system 200 starts data transmission to the laser printer 100, a bulk of print data including image data and print related commands are transmitted to a memory area operating as a receiving buffer reserved in the RAM 10 in a direct memory access (DMA) mode through the host system interface 14 to be temporarily stored.

By then proceeding with a printer emulation program stored in the program ROM 8 for emulating a system program of a predetermined printer model, the CPU 5 reads and analyzes image data and the commands stored in the receiving buffer in the RAM 10. After the analysis by the CPU 5, the image data and the commands are converted into intermediate codes, a list of which is often called a display list. These intermediate codes are then stored in a page buffer formed in the RAM 10. After completing filling in this page buffer with intermediate codes, the CPU 5 extends these intermediate codes in the page buffer into a frame buffer formed in the RAM 10 in a bitmap data form in accordance with a system program stored in the program ROM 8.

Then, the control unit 4 sends the image data stored in the frame buffer as well as a paper tray selection command, a print command, and so forth to the print unit 1 through the print unit interface 11. Upon receiving the paper tray selection command and the print command, the print unit 1 executes selecting a paper tray, feeding paper, and forming an image on paper in accordance with the transmitted image data from the frame buffer. In this way, image data transmitted from the host system 200 is processed through the control unit 4 so as to be recorded on paper by the laser beam printer 100.

Figure 2:
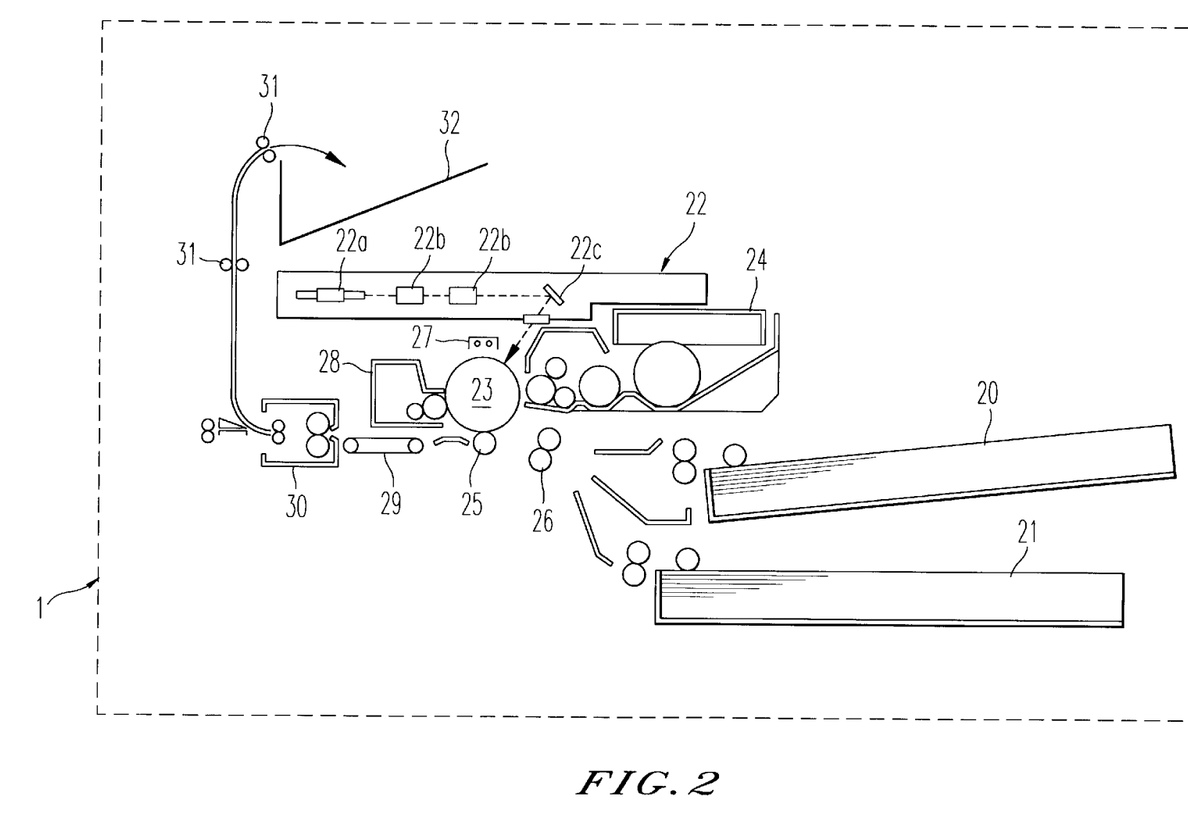
FIG. 2 is an illustration for showing a configuration of the image forming apparatus as an exemplary embodiment according to the present invention.

Next, an image forming process by the print unit 1 is explained with respect to FIG. 2. The above-mentioned image data from the control unit 4 in FIG. 1 is input to an optical writing unit 22 in FIG. 2. This optical writing unit 22 includes a laser diode (not shown) which generates a laser beam in accordance with the image data.

The laser beam from the laser diode is polarized by a polygon mirror 22a, through an optical system 22b including elements such as an fθ(theta) lens and the like, reflected by a mirror 22c, and guided to the surface of a photoconductive drum 23 rotating clockwise, which surface is evenly charged by a charging unit 27. The laser beam then forms an electrostatic latent image on the surface of the photoconductive drum 23 in accordance with the image data. Then, this electrostatic latent image is visualized into a toner formed image through a toner image development process conducted by a development unit 24.

Also, a paper tray selection command sent from the control unit 4 is executed by the print unit 1, and recording paper is subsequently fed either from a first paper tray unit 20 or a second paper tray unit 21 in synchronism with the above-mentioned image forming process. The recording paper is stopped when the leading edge thereof impinges on a pair of registration rollers 26, and is restarted to be fed in synchronism with movement of the toner image formed on the surface of the photoconductive drum 23.

An image transfer unit 25 for transferring the toner image formed on the surface of the photoconductive drum 23 onto the surface of the recording paper is provided in an opposite position to the photoconductive drum 23 relative to a path of the recording paper. When the recording paper passes through the path made between the image transfer unit 25 and the photoconductive drum 23, the toner forming the image is transferred onto the surface of the recording paper.

After this image transferring process, the recording paper is further transferred by a transferring belt 29 to a fixing unit 30 including a heat roller, a pressure roller, and so forth so that the toner forming the image on the surface of the recording paper is firmly fixed thereon. The recording paper is then guided by eject rollers 31 so as to be ejected to an eject tray 32.

The surface of the photoconductive drum 23 is cleaned by a cleaning unit 28 which collects the toner remaining thereon, after the image transferring process has been completed. In this way, an image of one page is formed on a recording paper.

Figure 3:
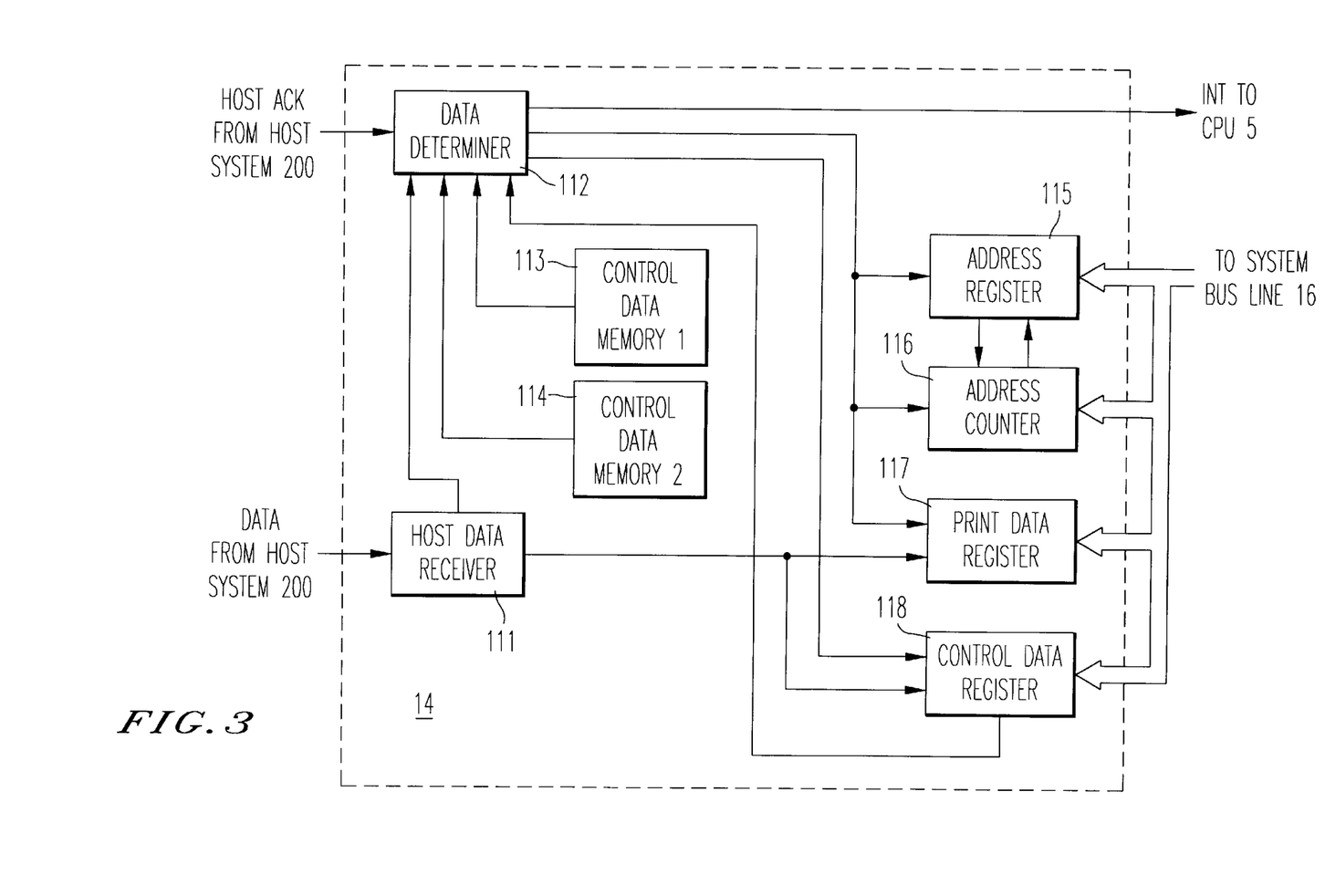
FIG. 3 is a block diagram of an exemplary host system interface according to the present invention.

Next, a configuration of the host system interface 14 of the control unit 4 is explained with respect to FIG. 3. A host data receiver 111 shown in FIG. 3 receives parallel data (DATA), which includes print data and control data as described hereinbefore, from the host system 200. At the same time, a data determiner 112 receives a host acknowledgment signal (HOST ACK), which is a high (logical one "1") signal when transmitting data is print data or a low (logical zero "0") signal when transmitting data is control data, from the host system 200. When the host data receiver 111 detects a start of data transmission from the host system 200, the host data receiver 111 notifies the data determiner 112 of the start of the data transmission, following which the data determiner 112 generates an interrupt signal (INT) supplied to the CPU 5 to request loading of a start address in the RAM 10 to the host system interface 14 for starting a relatively high speed data transmission such as a direct memory access (DMA).

A first control data memory 113 previously stores a number of predetermined emergency control data which is needed to be immediately executed by the CPU 5, for example, a cancel data command. A second control data memory 114 also previously stores a number of predetermined non-emergency control data, for example, a paper tray selection, which does not request the CPU 5 to execute an immediate action.

An address register 115 registers a start address, given by the CPU 5, designating an address in the RAM 10 at which address first print data is transmitted with a high speed data transmission method such as a direct memory access (DMA) mode. The address register 115 also registers a last address, given by the CPU 5, designating another address in the RAM 10, at which address last print data has been transmitted.

An address counter 116 receives a start address from the address register 115 and outputs that start address to the address bus line of the system bus line 16 to designate the start address in the RAM 10, at which address first print data is transmitted with a high speed data transmission method such as a direct memory access (DMA) mode. The address counter 116 also includes a function for incrementing the current address by 1 so as to output a next address in the RAM 10 to the address bus line of the system bus line 16.

A print data register 117 registers print data transmitted from the host data receiver 111, and outputs the print data to the data bus line of the system bus line 16. The address register 115, the address counter 116, and the print data register 117 are gated by an output signal, which is effective when transmitting data is print data, from the data determiner 112. Thus, the print data in the print data register 117 is transmitted into an address in the RAM 10 designated by the address counter 116.

A control data register 118 registers control data transmitted from the host data receiver 111 with a gate condition determined by a signal from the data determiner 112, and has a registering capacity for a predetermined number of control data. When the control data register 118 is filled with the predetermined number of control data, the data determiner 112 sends an interrupt signal (INT) to the CPU 5 for requesting immediate processing of the control data filling the control data register 118.

Since the data determiner 112 is arranged to receive inputs from the host data receiver 111, the control data memory 113, and the control data memory 114, the data determiner 112 compares these inputs and subsequently determines whether data transmitted from the host system 200 is print data, emergency control data, or non-emergency control data. The data determiner 112 may fail in determining whether the transmitted data is emergency control data or non-emergency control data when the transmitted data is not registered either in the control data register 113 or the control data register 114. In this case, the data determiner 112 determines for the sake of safety that the transmitted data is emergency control data.

When transmitted data is emergency control data, the data determiner 112 subsequently outputs an interrupt signal (INT) to the CPU 5 to request immediate processing of the emergency control data. In this case, the current data transmission to the RAM 10 may be stopped temporarily, or terminated, depending upon a type of the emergency control data. In addition, upon detecting the emergency control data, the data determiner 112 instructs the address counter 116 to transfer the last address in the RAM 10, where print data has been stored under the DMA data transmission mode, to the address register 115 so as to restart data transmission.

When transmitted data is non-emergency control data, the data determiner 112 opens the gate to the control data register 118 so as to store the transmitted data in the control data register 118, while the data determiner 112 normally opens the gate to the print data register 117. In this case, the current data transmission to the RAM 10 may be temporarily stopped until the next print data is transmitted. In addition, upon detecting the non-emergency control data, the data determiner 112 instructs the address counter 116 to transfer the last address in the RAM 10, where print data has been stored under the DMA data transmission mode, to the address register 115 so as to restart data transmission.

The data determiner 112 may be arranged to generate an interrupt signal to the CPU 5 on every determination so that the CPU 5 can recognize every transmitted data, although in this operation the load to the CPU 5 becomes relatively heavier.

Figure 4:
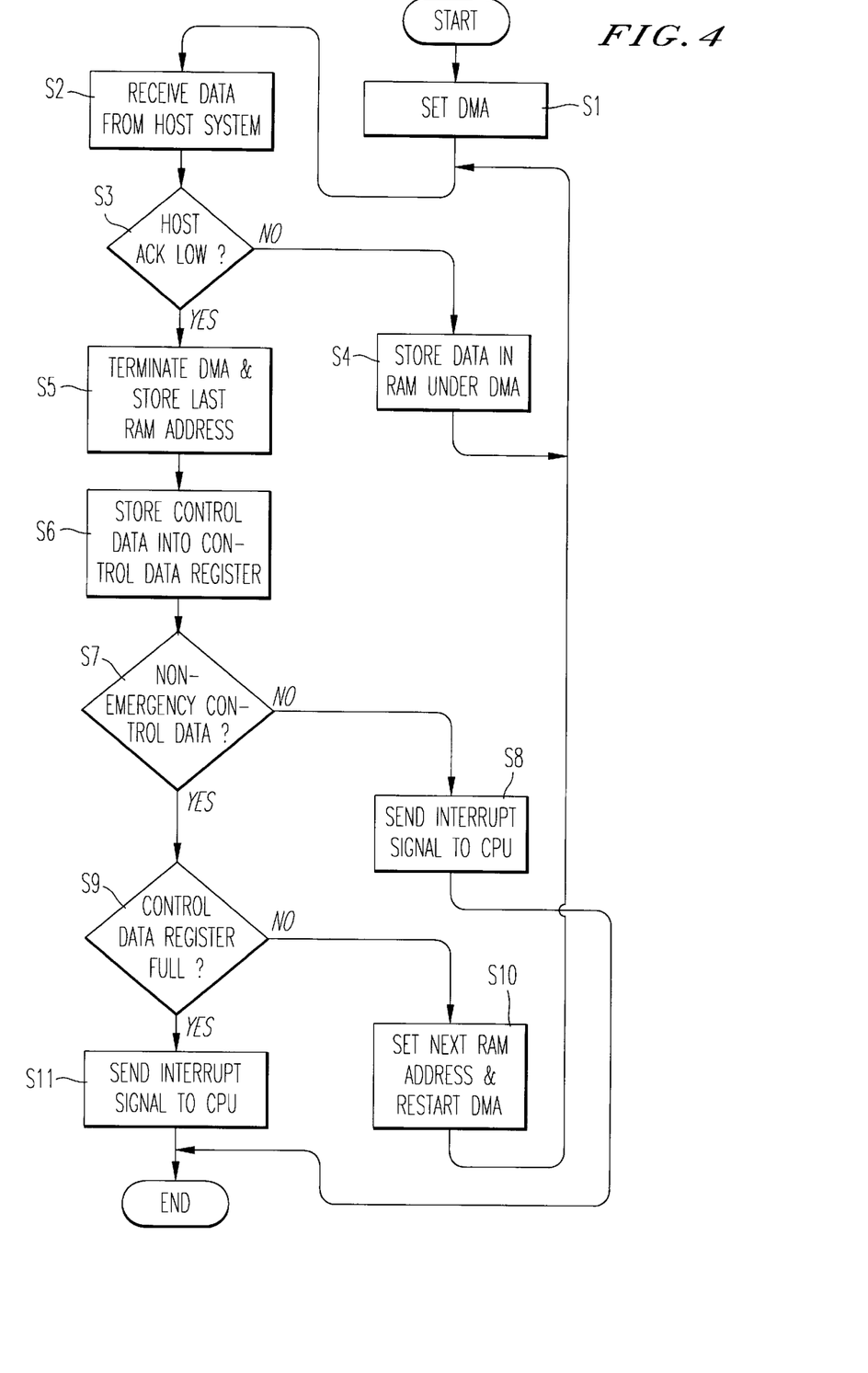
FIG. 4 is a flowchart for explaining an operation of the image forming apparatus according to the present invention.

Next, an operational flow of data handling from receiving data from the host system until storing print data into the RAM is explained with respect to FIG. 4. When the laser printer 100 starts to receive data from the host system 200, the host data receiver 111 receives data and the data determiner 112 receives HOST ACK. In this event, the data determiner 112 sends, in Step S1 in FIG. 4, an interrupt signal (INT) to the CPU 5 to notify a start of a data transmission such as DMA. Then, the host data receiver in turn receives the following data from the host system in Step S2.

The data determiner 112 determines in Step S3 whether or not HOST ACK is low (logical zero "0"). When HOST ACK is not low (logical zero "0"), NO in step S3, the data determiner 112 determines that the transmitted data is print data and subsequently allows data transmission to the RAM 10 by DMA in Step S4. On the other hand, when HOST ACK is low (logical zero "0"), YES in step S3, the data determiner 112 determines that the transmitted data is control data. Subsequently, in step S5 the data determiner 112 stops the DMA data transmission and transfers a last address in the RAM to the address register 115 from the address counter 116 so as to store the last address, in which last address the last DMA transmitted data is stored.

The data determiner 112 then opens the gate of the control data register 118 to store the received control data in Step S6. Then, the data determiner 112 in Step S7 determines whether or not the transmitted data is non-emergency control data. When the transmitted data is not non-emergency control data, NO in step S7, the data determiner 112 sends an interrupt signal (INT) to the CPU 5 in Step S8 to request immediate processing of the emergency control data. After that, the program is ended. When the transmitted data is non-emergency control data, YES in step S7, the program proceeds to step S9.

In Step S9, the data determiner 112 determines whether or not the control data register 118 is filled with non-emergency control data, i.e., whether the non-emergency control data stored in control data register 118 exceeds a predetermined value. When the control data register 118 is not filled with non-emergency control data, NO in step S9, the data determiner 112 in Step S10 sets the address counter 116 with a next address in the RAM 10 so as to be ready to restart the DMA data transmission. When the control data register 118 is filled with the non-emergency control data, YES in Step S9, the data determiner 112 in Step S11 sends an interrupt signal (INT) to the CPU 5 to request immediate processing of the number of non-emergency control data.

In this way, the laser beam printer 100 can receive transmitted data from the host system 200 and execute a relatively high speed data transmission such as DMA with determining whether transmitted data is print data, emergency control data, or non-emergency control data by including the so arranged host system interface 14 therein.

This invention may be conveniently implemented using a background general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of background component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An image forming apparatus including a memory for storing print data and a central processing unit, comprising:
    data receiving means for receiving data including said print data and control data sent from a host system under a first data transmission mode;
    first storing means for storing said print data sent from said data receiving means and for outputting said print data to said memory under a second data transmission mode;
    second storing means for storing said control data sent from said data receiving means;
    third storing means for storing a value for designating an address in said memory into which said print data stored in said first storing means is transferred under said second data transmission mode;
    counting means for reading said address stored in said third storing means, for outputting said read address to an address bus line under said second data transmission mode, and for incrementing said read address by one;
    fourth storing means for storing a predetermined number of control data which can be processed after data transmission;
    print means for printing said print data stored in said memory; and
    data determining means for sending an interrupt signal to the central processing unit to indicate a start of said second data transmission mode and to request transferring said address in the memory at which print data is stored to said third storing means upon detecting said data sent from said data receiving means, for comparing said data sent from said data receiving means and control data stored in said fourth storing means, for determining whether said data sent from the host system is either one of print data and control data, for activating input and output gates of said first storing means, said third storing means, and said counting means to store said print data to said first storing means and to set said second data transmission mode and for invalidating input and output gates of said second storing means when said data determining means determines that said data is said print data, for invalidating input and output gates of said first storing means, said third storing means, and said counting means to terminate said second data transmission mode, for activating input and output gates of said second storing means to store said control data sent from said data receiving means and for instructing said counting means to transfer a present storing value which is a last address of said second data transmission mode to said third storing means when said data determining means determines that said data is said control data.

2. An image forming apparatus according to claim 1, wherein said first data transmission mode is in conformance to an ECP (extended capabilities part) data transmission mode.

3. An image forming apparatus according to claim 1, wherein said second storing means stores up to a predetermined number of control data, and said data determining means sends an interrupt signal to said central processing unit to request immediate processing of control data stored in said second storing means upon detecting that said second storing means is filled with said predetermined number of said control data.

4. An image forming apparatus according to claim 2, wherein said second storing means stores up to a predetermined number of control data, and said data determining means sends an interrupt signal to said central processing unit to request immediate processing of control data stored in said second storing means upon detecting that said second storing means is filled with said predetermined number of said control data.

5. An image forming apparatus according to claim 1, further comprising fifth storing means for storing a predetermined number of control data required to be immediately processed by the central processing unit, and wherein said data determining means sends an interrupt signal to the central processing unit upon detecting the control data required to be immediately processed, to request immediate processing of the control data required to be immediately processed.

6. An image forming apparatus according to claim 2, further comprising fifth storing means for storing a predetermined number of control data required to be immediately processed by the central processing unit, and wherein said data determining means sends an interrupt signal to the central processing unit upon detecting the control data required to be immediately processed, to request immediate processing of the control data required to be immediately processed.

7. An image forming apparatus according to claim 3, further comprising fifth storing means for storing a predetermined number of control data required to be immediately processed by the central processing unit, and wherein said data determining means sends an interrupt signal to the central processing unit upon detecting the control data required to be immediately processed, to request immediate processing of the control data required to be immediately processed.

8. An image forming apparatus according to claim 4, further comprising fifth storing means for storing a predetermined number of control data required to be immediately processed by the central processing unit, and wherein said data determining means sends an interrupt signal to the central processing unit upon detecting the control data required to be immediately processed, to request immediate processing of the control data required to be immediately processed.

9. An image forming apparatus according to claim 1, wherein said second data transmission mode is a direct memory access mode.

10. An image forming apparatus according to claim 2, wherein said second data transmission mode is a direct memory access mode.

11. An image forming apparatus according to claim 3, wherein said second data transmission mode is a direct memory access mode.

12. An image forming apparatus according to claim 4, wherein said second data transmission mode is a direct memory access mode.

13. An image forming apparatus according to claim 5, wherein said second data transmission mode is a direct memory access mode.

14. An image forming apparatus according to claim 6, wherein said second data transmission mode is a direct memory access mode.

15. An image forming apparatus according to claim 7, wherein said second data transmission mode is a direct memory access mode.

16. An image forming apparatus according to claim 8, wherein said second data transmission mode is a direct memory access mode.

17. An image forming apparatus including a first memory for storing print data and a central processing unit, comprising:

a data receiving circuit receiving data including said print data and control data sent from a host system under a first data transmission mode;

a second memory for storing said print data sent from said data receiving means and for outputting said print data to said first memory under a second data transmission mode;

a third memory for storing said control data sent from said data receiving circuit;

a data determining circuit determining whether the received data is print data or control data, determining whether the control data is emergency control data or non-emergency control data and determining whether an amount of control data stored in the third memory exceeds a predetermined value, wherein the data determining circuit terminates outputting the print data to the first memory under the second data transmission mode when the received data is determined to be emergency control data, and when the received data is determined to be non-emergency control data and the amount of control data stored in the third memory exceeds the predetermined value, and wherein the data determining circuit stores the control data in the third memory when the received data is determined to be non-emergency control data and the amount of control data stored in the third memory is less than the predetermined value.

18. An image forming apparatus according to claim 17, wherein said first data transmission mode is in conformance to an ECP (extended capabilities part) data transmission mode.

19. An image forming apparatus according to claim 17, wherein said second data transmission mode is a direct memory access mode.

* * * * *